United States Patent Office 3,081,242
Patented Mar. 12, 1963

3,081,242
GRAFT CO-POLYMERS
Robert Roy Smith, East Bergholt, Dennis Charles Macmillan Mann, Mistley, and John Frederick Salmon, Great Yarmouth, England, assignors to B. X. Plastics Limited, Brantham Works, near Manningtree, England, a British company
No Drawing. Filed Aug. 20, 1958, Ser. No. 756,070
Claims priority, application Great Britain Aug. 23, 1957
8 Claims. (Cl. 204—154)

This invention relates to the manufacture of polymeric materials, and more especially to graft co-polymers.

When a polymer chain is reactivated and side chains consisting of another or the same monomer are caused to grow on the existing polymer, a so-called graft co-polymer is obtained. The term graft co-polymer is therefore used to designate a macromolecule in which the second polymeric chain exists as branches on the primary or "trunk" chain. The manufacture of such compounds is described, for example, in our British patent application Nos. 1,543/57, 1,544/57 and 4,987/57. They are distinct from ordinary co-polymers in which the components are usually distributed at random in a straight or branched chain, and they generally possess apreciably different properties from ordinary co-polymers.

Graft co-polymers may be obtained by various methods. Conveniently they may be produced by the use of high intensity irradiation for example, γ-rays from a Co[60] source. According to one method, a polymer is subjected to ionising radiation in the presence of oxygen to form peroxidised active centres on the polymer, and the irradiated polymer is contacted with a grafting material capable of being polymerized by free radicals, especially a monomeric vinyl compound. Although in this irradiation method the formation, in addition to the graft product, of homopolymers of the monomer is considerably less than in the hitherto known "chain transfer" method, polymerization of the monomer in the monomer phase, does occur to some extent, and this is objectionable from the point of view of the re-use of that material.

The present invention is based on the observation that in the above-mentioned irradiation method for the production of graft co-polymers, the extent of the polymerization of the monomer in the monomer phase can be substantially reduced by treating the peroxidised polymer, after the irradiation and before contacting it with the grafting material, with an excess of an organic solvent in which the polymer is insoluble.

As a result of our investigations we are led to the conclusion that upon irradiation of a polymer a small proportion of soluble peroxide material is formed in addition to the peroxidised active centres on the polymer, and that in the above-mentioned method hitherto used for the production of graft co-polymers which involves irradiation of a polymer in the presence of oxygen and contacting the irradiated polymer with a grafting material, this soluble peroxidic material has leached out into the monomer and has caused homo-polymerization in the liquid phase. This has not previously been appreciated and we have found that this small amount of soluble peroxidic material can be removed by treatment with an organic solvent, as a result of which polymerization of the monomer in the monomer phase is substantially prevented in the subsequent grafting operation.

The present invention thus provides a process for the manufacture of graft co-polymers, wherein a polymer is subjected to high energy, ionising radiation in the presence of oxygen to produce peroxidised active centres on the polymer, the peroxidised polymer so produced is treated with an excess of an organic solvent in which it is insoluble so as to extract the small proportion of soluble peroxide material which is produced on irradiation and the solvent-treated polymer is then contacted with a grafting material capable of being polymerized by free radicals, especially a monomeric vinyl compound.

The solvent-treated polymer should preferably be dried substantially free of solvent before the subsequent grafting operation, but the presence of residual amounts of solvent may be tolerated unless they interfere chemically with the grafting reaction.

We have found, for example, that when a polyethylene film that has been subjected to ionising radiation in the presence of oxygen is heated with excess liquid acrylonitrile monomer in vacuo, the excess monomer is always polymerized to a small extent. This is shown by the presence of an insoluble white powder of polyacrylonitrile developing in the monomer phase and appearing on the surface of the polyethylene film. If, however, a similar experiment is carried out but the irradiated polyethylene film is treated with excess of methylene dichloride before heating it with the liquid monomer, graft polymerization of the film takes place with substantially less polymerization of the monomer in the monomer phase or at the surface of the film.

Our co-pending British patent application No. 1,543/57 describes the incorporation of a polymerization inhibitor in the monomer in the method of producing graft co-polymers by means of ionising radiation, for the purpose of substantially reducing the extent of the polymerization in the monomer phase without appreciably affecting the rate of graft polymerization. Our co-pending British patent application No. 4,987/57 relates to the production of graft co-polymers by means of ionising radiation and states that if the monomer in contact with the polymer is in the vapour phase the extent of the polymerization of the monomer in the monomer phase is substantially reduced or prevented.

In the process of the present invention the use of an inhibitor and of the monomer in the vapour phase can be dispensed with, but it is nevertheless permissible, and in some cases may be advantageous, to contact the irradiation and solvent-treated polymer with monomer vapour and/or to incorporate an inhibitor in the liquid monomer.

The polymer may be any polymeric material or polycondensation product or macromolecular material which is capable of producing under ionising radiation active centres or free radicals along the polymer chain, at which grafting will take place in the presence of a polymerizable monomer. As such polymers, polycondensation products or macromolecular materials there may be mentioned, for example, polyethylene, cellulose, cellulose acetate, cellulose triacetate, polyvinyl chloride, polyamides, polystyrene, rubber and polymethylmethacrylate, and their copolymers.

The term "polymer" is used herein to include polycondensation products and macromolecular materials. As the organic solvent used for treating the irradiated polymer there may be used any inert organic solvent in which the polymer is insoluble, and which is capable, when the polymer is treated with sufficient quantity of the solvent for a sufficient time and at a suitable temperature, of extracting soluble peroxidic material that is formed on irradiation. There may be mentioned, more especially, methylene dichloride and acetone. The treatment with the organic solvent may be conveniently carried out at room temperature and for several hours, for example, 100 hours. A mixture of two or more solvents may be used.

The suitability of any organic solvent and/or of the time and temperature of the treatment can be readily ascertained by the following simple test. An irradiated polymer is treated with the solvent for a given time, preferably several hours, and temperature (which should not exceed approximately 100° C., or 80° C. in the case of nitrobenzene) and the extract is then treated with a monomer, preferably the monomer to be used as grafting material, with application of heat. If homo-polymerization occurs this indicates that soluble peroxidic material has been extracted and that the solvent and conditions of treatment are satisfactory.

As the monomeric grafting material there come into consideration, more especially, vinyl compounds as, for example, styrene, vinyl chloride, vinylidene dichloride, vinyl carbazole, isoprene, butadiene, methyl methacrylate, acrylonitrile, acrylamide and other acrylic derivatives, and mixtures of two or more such compounds. The irradiated and solvent-treated polymer is advantageously contacted with the grafting material at a raised temperature, for example, 100° C. and under sub-atmospheric pressure. As ionising radiation there is to be understood radiation which will produce ions in air under normal atmospheric conditions, which ions can be detected by their charge. As such radiation there may be mentioned $\beta$-rays, accelerated electrons, thermal neutrons, accelerated deuterons, accelerated protons, X-rays or, more especially, $\gamma$-rays. As sources for such radiation there may be used atomic piles, electron or particle accelerators, radioactive isotopes, and X-ray equipment. The type of ionising radiation used and the dose may be chosen according to the properties desired in the final graft product.

The polymeric starting material may be in several forms, for example, a film or a fine powder.

It is to be understood that the term "graft co-polymer" is used herein to include a graft co-polymer which contains some block co-polymer in admixture with it. A block co-polymer is obtained when the polymer chain is broken and chains of another monomer enter the chain and, so to speak, bridge the gap, so that in the resulting compound, there is an alternation of long sequences of one unit with long sequences of another unit.

The following example illustrates the invention:

A film of polyethylene ("Alkathene HD"), of about 4 mil in thickness, was irradiated at room temperature in air by means of $\gamma$-rays from a $Co^{60}$ source to a total dose of 5.2 mrep. The irradiated film was then divided into three equal parts and treated as follows:

A. (Not in accordance with the invention.) The first part was immediately heated in vacuo with excess of liquid acrylonitrile monomer (carefully distilled) at 100° C., for 6 hours. Considerable polymerization occurred in the liquid monomer phase as evidenced by considerable precipitation of white polyacrylonitrile. The film at the end of this treatment had increased in weight by 122 percent, essentially due to polymerized acrylonitrile in graft form.

B. (In accordance with the invention.) The second part of the irradiated film was treated with an excess of methylene dichloride at the boiling point of the latter for 100 hours and was then allowed to dry. It was then heated in vacuo with liquid acrylonitrile under exactly the same condition of temperature, time and excess of the monomer as used in A. The grafting of the film had proceeded to the extent of 109 percent by weight, but in this case, the amount of homopolymer formed in the liquid acrylonitrile was only ⅙ by weight of the amount obtained in experiment A.

C. (In accordance with the invention.) Experiment B was repeated but with the use of acetone instead of methylene dichloride, and the treatment being carried out at the boiling point of acetone, the conditions otherwise being the same. Grafting of the polyethylene film occurred to the extent of 126 percent by weight, but as in B, with the formation of only ⅙ by weight of the amount of homopolymer obtained in experiment A.

We claim:
1. A process for the manufacture of graft co-polymers, which comprises subjecting a polymer selected from the group consisting of polyethylene, cellulose, cellulose acetate, cellulose triacetate, polyvinyl chloride, polyamides, polystyrene, rubber and polymethylmethacrylate, in the presence of oxygen, to high energy, ionising radiation to a dose at least sufficient to produce polymerisation initiating peroxidised active centres on the polymer, treating the peroxidised polymer so produced with an excess of a solvent selected from the group consisting of methylene dichloride and acetone and in which it is insoluble, at a temperature within the range of room temperature to 100° C. and not exceeding the softening point of the polymer, until the small proportion of soluble peroxide material produced on irradiation has been extracted, and subsequently contacting the solvent-treated polymer with a grafting material capable of being polymerised by free radicals.

2. A process as claimed in claim 1, wherein the grafting material is a monomeric vinyl compound.

3. A process as claimed in claim 1, wherein the solvent-treated polymer is dried substantially free of solvent before the subsequent grafting operation.

4. A process as claimed in claim 1, wherein the solvent-treated polymer is contacted with the grafting material at a raised temperature and under sub-atmospheric pressure.

5. A process for the manufacture of graft co-polymers, which comprises subjecting polyethylene, in the presence of oxygen, to high-energy, ionising radiation to a dose at least sufficient to produce polymerisation-initiating peroxidised active centres on the polyethylene, treating the peroxidised polyethylene so produced with an excess of a solvent selected from the group consisting of methylene dichloride and acetone, at a temperature within the range of room temperature to 100° C. and not exceeding the softening point of the polyethylene, until the small proportion of soluble peroxide material which is produced on irradiation has been extracted, and subsequently contacting the solvent-treated polyethylene with a monomeric vinyl compound at a raised temperature.

6. A process as claimed in claim 5, wherein the polyethylene is in the form of a film.

7. A process as claimed in claim 5, wherein the monomeric vinyl compound is liquid acrylonitrile.

8. A process as claimed in claim 5, wherein the solvent-treated polyethylene is contacted with the vapour of a polymerisable monomeric liquid vinyl compound containing in the liquid phase a polymerisation inhibitor.

References Cited in the file of this patent

UNITED STATES PATENTS

| 2,837,496 | Vandenberg | June 3, 1958 |
| 2,841,569 | Rugg et al. | July 1, 1958 |
| 2,849,419 | Hayes et al. | Aug. 26, 1958 |
| 2,863,812 | Graham | Dec. 9, 1958 |
| 2,878,174 | Rainer | Mar. 17, 1959 |
| 2,907,675 | Gaylord | Oct. 6, 1959 |
| 2,956,899 | Cline | Oct. 18, 1960 |

FOREIGN PATENTS

| 1,130,100 | France | Sept. 17, 1956 |

OTHER REFERENCES

Ballantine et al.: Jour. Polymer Science, 19 (January 1956), pages 219–224.

Ballantine et al.: Fission Products Utilization, IX, Studies on Radiation Induced Graft Copolymerization, AEC Report BNL–414 (T-81), October 1956, 14 pages.